United States Patent [19]

Hoffman

[11] Patent Number: 4,791,779
[45] Date of Patent: Dec. 20, 1988

[54] LEAF-BAGGER

[76] Inventor: Joel A. Hoffman, 405 Jones St., Old Hickory, Tenn. 37138

[21] Appl. No.: 89,089

[22] Filed: Aug. 25, 1987

[51] Int. Cl.⁴ .......................................... A01D 34/70
[52] U.S. Cl. ...................................... 56/202; 56/16.6
[58] Field of Search ..................... 56/16.6, 16.9, 202

[56] References Cited

U.S. PATENT DOCUMENTS

| | | | |
|---|---|---|---|
| 3,574,272 | 4/1971 | Krewson | 56/202 |
| 3,724,186 | 4/1973 | Mattson | 56/202 |
| 3,890,772 | 6/1975 | Seifert et al. | 56/202 |
| 3,999,316 | 12/1976 | Palmer | 56/202 |
| 4,158,279 | 6/1979 | Jackson | 56/202 |
| 4,233,806 | 11/1980 | Richardson | 56/16.6 |
| 4,345,418 | 8/1982 | Arizpe | 56/202 |
| 4,598,536 | 7/1986 | Langley | 56/16.6 |
| 4,693,063 | 9/1987 | Hoepfuer et al. | 56/16.6 |

*Primary Examiner*—John Weiss
*Attorney, Agent, or Firm*—Richard C. Litman

[57] ABSTRACT

A leaf receptacle bag is affixed to a vertically disposed support surface that has means for adapting to a leaf conduit. The leaf conduit conveys leaves from a tractor vacuum unit through an orifice in the vertically disposed support surface, the adapter of the conduit directing the leaves diagonally across the interior of the leaf receptacle bag to thereby deposit the leaves at the lower portion of the bag.

4 Claims, 1 Drawing Sheet

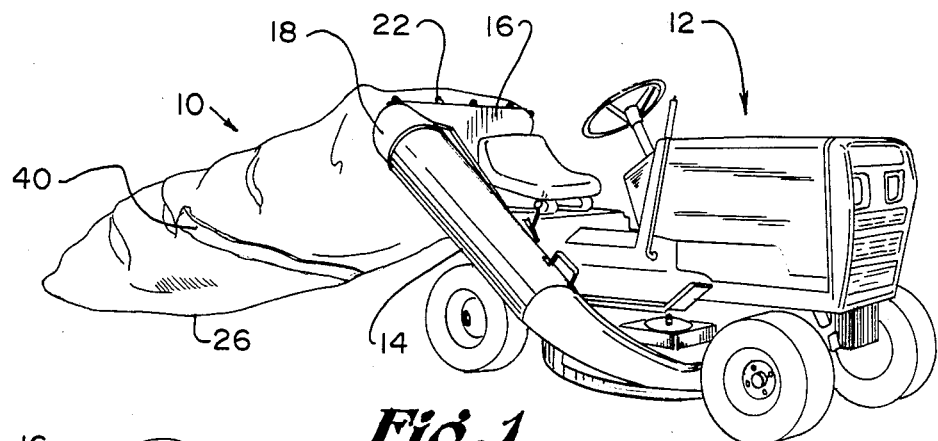
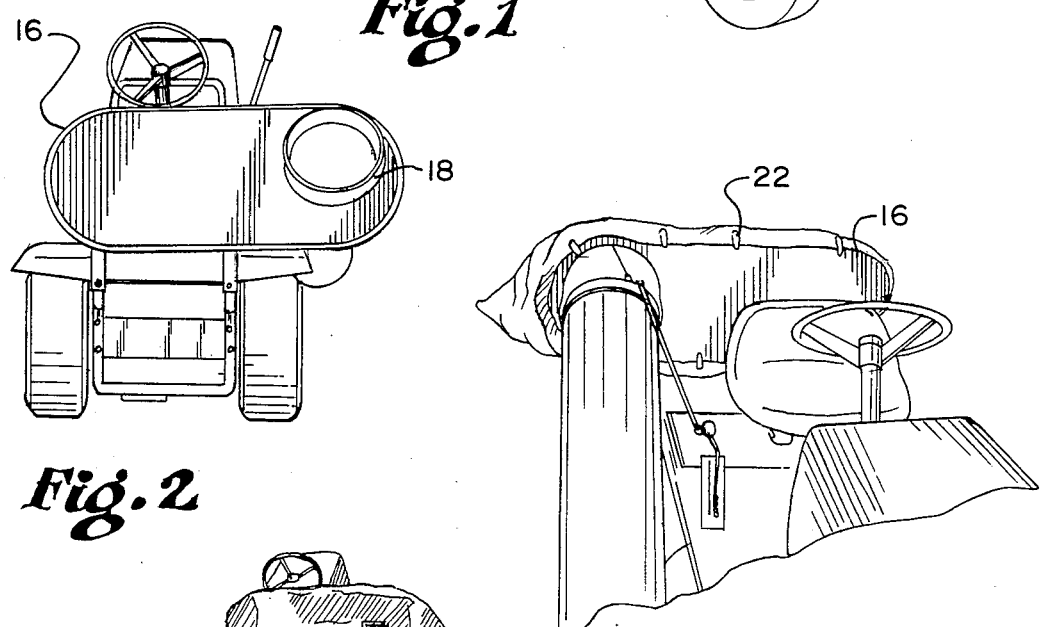
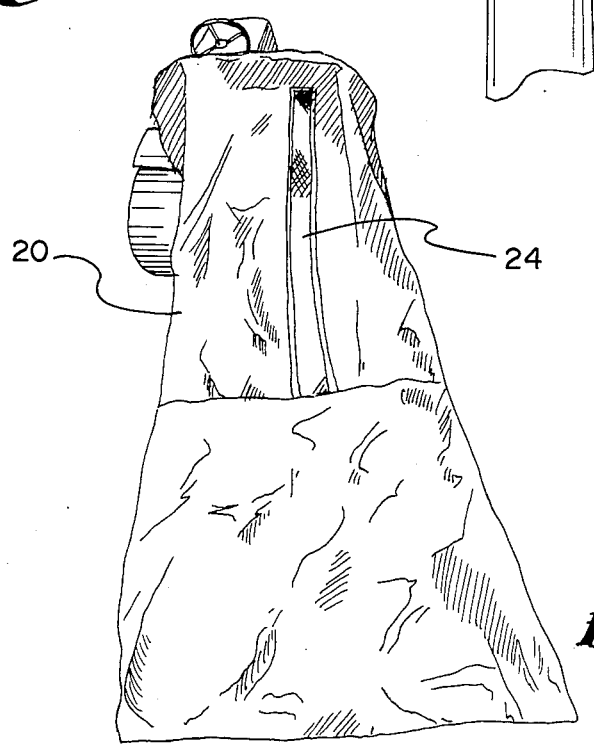

LEAF-BAGGER

FIELD OF THE INVENTION

This invention relates to devices for vacuuming leaves from a lawn, and more particularly to those devices for bagging leaves prior to their disposal.

BACKGROUND TO THE INVENTION

The present invention relates to leaf bagging-equipment and, specifically, to that type of leaf-bagger that is attached to a lawn tractor or other suitable machine that has a typical rotary attachment for the powering up of leaves.

This apparatus also relates to that type of equipment used in vacuuming leaves that utilize a flow of air to displace and disperse them into a hopper or container that is used to hold the vacuumed leaves prior to their disposal This device also relates to that combination of equipment, using a tractor and a tractor-mounted leaf-carrying means for vacuuming and containing leaves and for depositing same on a compost pile.

DESCRIPTION OF THE PRIOR ART

The following cited references are exemplary of the U.S. prior art. They are:

| U.S. Pat. No. | Inventor |
| --- | --- |
| 3,522,695 | Musgrave |
| 3,423,917 | Leader |
| 4,054,023 | Carpenter |

U.S. Pat. No. 3,522,695, issued to Musgrave, discloses a debris receptacle; a flow chamber, an inlet, and an outlet to the chamber; and a flexible sleeve rimming the inlet opening to provide a movement of the debris in the chamber.

U.S. Pat. No. 3,423,917, to Leader, teaches a construction of a grass catcher bag, incorporating an elongated tubular member of heat sealable material that has an inlet, a heat sealed seam that forms a discharge opening and a second sealed seam that forms a passageway connecting the discharge opening with the atmosphere.

U.S. Pat. No. 4,054,023, issued to Carpenter, discloses a grass collector apparatus comprising a bracket with two spaced legs and arms; a frame connected to the bracket to support a grass collection bag; and a means to connect the grass clipping discharge outlet of a rotary lawn mower.

SUMMARY OF THE INVENTION

A primary object of this invention is to provide a receptacle bag means for collecting leaves that are vacuumed from the ground with a rotary-type tractor attachment. This receptacle bag means collects the vacuumed leaves, retaining them until the receptacle is emptied.

Another object of the present device is to provide a receptacle bag means for collecting leaves such that the leaves that are collected are displaced to the back or bottom-most portion of the receptacle means with the further advantage that the bag need not be emptied as often.

Yet another object of the present invention is to provide a receptacle means that is large enough so as to preclude having to recycle or empty the receptacle device as with conventional receptacle bags or leaf collecting means.

Still another object of the invention is to provide a construction that is simply designed and easy to operate and is yet sturdy and fully functional in the leaf collecting activity.

A still further object of the invention is to utilize a minimum of rigidly affixed and movable parts, such that the device is operationally efficient and cost effective.

DESCRIPTION OF THE DRAWINGS

FIG. 1 is a elevational view of the device attached to a typical lawn tractor that has a rotary vacuum attachment mounted to its undercarriage.

FIG. 2 is a rear-elevational view of the device showing a support frame that is vertically disposed to the ground.

FIG. 3 is a top view of the bag receptacle, illustrating the air outlet means disposed on the upper surface thereof.

FIG. 4 is a perspective end view of the leaf bagger attached to a typical lawn tractor.

DESCRIPTION OF THE PREFERRED EMBODIMENT

Referring now to FIGS. 1 through 3, device 10 includes a leaf conduit 14 rigidly affixed to a rotary vacuum attachment that is mounted to the undercarriage of tractor 12. Leaf conduit 14 extends to the rear of the tractor 12, and angles upward at the point it leaves the tractor to clear the rear wheels of the tractor and continues upward and rearward toward support surface 16.

Support surface 16 is rigidly affixed to the tractor at any suitable point behind the seat. Leaf conduit 14 enters conduit adapter 18 that is rigidly attached to support surface 16. Conduit adapter 18 is positionally disposed to one side of the tractor such that leaf conduit 14 extends upward over a rear wheel and directly enters conduit adapter 18, thereby eliminating and possibility of structural or functional interference with the operation of the tractor itself.

The upward angle causes leaf conduit 14 to enter conduit adapter 18 at a slight angle such that leaves are blown in a diagonal manner into receptacle means 20. In this manner, the leaves are distributed throughout receptacle means 20 dragged behind tractor. The acute angle bend angles the leaf conduit 14 terminal end adaptor 18 such that leaves flowing there through are directed in a diagonal direction and downwardly through the interior of said leaf receptacle bag, whereby the efficiency of said leaf receptacle bag to receive leaves and move them to a lower most portion thereof is improved.

Leaf receptacle bag 20 is attached over support frame 16 by any suitable fastening means 22, such as hook and loop as illustrated herein. Although many other fasteners types could be employed such as a heavy duty zippered construction.

Leaf bag 20 being sized such that the lower or rearward portion thereof is disposed to the ground behind the tractor, the upper portion of receptable bag 20 as attached to the support surface 16 is elevated over the lower portion.

As leaves are blown into leaf receptacle bag 20, through conduit adapter 18, they are displaced by gravity, tumbling downward along the inner surface of the lower portion of the bag, further displacing them, along the inclined inner surface thereof, to the rear, bottom portion of the bag. The length of receptacle bag 20 being a ratio of 1½ to 3 times the length of the tractor to which it is attached.

Receptacle bag 20 then makes an oblique angle, as calculated along a longitudinal axis of the bag and along a longitudinal axis of leaf conduit 14, such that the point of juncture between the lead conduit 14 and the conduit adapter 18 is a proximate point of the apex of an oblique angle.

An air outlet means 24 is deployed on the upper surface of the receptacle bag 20. If an air outlet means 24 is used it takes the form of meshed orifices, configured as a longitudinally disposed strip of narrow dimensions such that when air enters conduit adapter 18, the air flows downward into the bag, carrying leaves with it. As air is deflected off the interior walls of receptable bag 20, it causes leaves to fall to the bottom of receptable bag 20. Further, air outlet means 24 is disposed along a longitudinal axis, being centered on the bag and positionally deployed along the upper half thereof such that the lower half of receptacle bag 20 is fully utilized to carry leaves deposited therein.

The leaves are emptied by detaching receptacle bag 20 from the hook and loop fasteners 22 on support frame 16, or alternatively by unfastening VELCRO strip 40 transversely deployed across the lower surface of receptacle bag 20. Fastenings means 40 is deployed across an area of receptacle bag 20 not in contact with the ground as the bag is pulled by the tractor, however, once the operator reached under, loosening same, and the tractor pulls forward, the leaves are deposited on the ground.

A reinforcing material 26 can be, optionally, deployed under the bag to extend the life of the bag itself. Reinforcing material 26 itself can be of any suitable material to reinforce the bag including additional layers of the same materials out of which the bag is constructed.

It can be seen from the foregoing that the objects and advantages of the device have been accomplished. Further, it is understood that as many small changes will occur to one skilled in the art, the foregoing disclosure is illustrative of the invention, all equivalents thereof fall with the scope of invention, the imitations of which reside only in the claims.

What is claimed is:

1. A leaf bagger, connected to an undercarriage leaf vacuum mechanism of a lawn tractor, comprising:

a leaf conduit; said conduit rigidly affixed to a vertically disposed support frame; said support frame being structurally housed in a vertically disposed support surface; said support frame being rigidly affixed to said tractor structure;

said leaf conduit having an upwardly disposed terminal thereon, said upwardly disposed terminal having a leaf bag adapter circumferentially affixed thereto;

said leaf conduit, support frame, and support surface being, in combination, disposed to the rear of a tractor unit such that said leaf conduit extends transversely from said upwardly disposed leaf conduit adapter to said tractor undercarriage vacuum mechanism;

a leaf receptacle bag; said leaf receptacle bag affixed to said vertically disposed support surface; said leaf receptacle bag having a leaf conduit orifice disposed proximate to said support surface; said leaf conduit extending therethrough such that leaves are blown, by the action of said leaf vacuum mechanism, into said leaf receptacle bag;

said leaf receptacle bag forming thereby an oblique angle with said leaf conduit and thereby dragged behind the lawn tractor; said conduit depositing leaves within said leaf receptacle bag; said leaves becoming deposited at the lower, rearward portion thereof through the action of gravity and through the action of the tractor device moving over the earth and dragging the bag; whereby, leaves are propelled in a transverse, upward motion by the tractor mechanism, thence into said receptable bag and downward, along a slope formed by the interior of said leaf bag receptacle, to a rear-lower portion thereof;

said leaf receptacle bag has an air outlet; said air outlet disposed along the upper surface thereof, whereby excess air from said leaf vacuum device escapes from said leaf receptable bag;

said air outlet is a mesh strip, said mesh strip being disposed to the upper layer of said receptable bag; said air outlet strip being disposed along a longitudinal axis of said leaf bag receptacle; whereby said leaf receptacle bag is partially inflated with air from said tractor leaf vacuum unit, with the further result that air flows stream like along said longitudinal axis of said leaf receptacle bag, carrying therewith leaves, which subsequently fall to the bottom of said leaf receptacle bag as said air moves through said longitudinally disposed air outlet;

said air outlet strip is disposed only along a upper one half portion of said leaf receptacle bag, as measured longitudinally along the bag, from bottom to top;

said receptacle bag has fastening means deployed transversely across a bottom portion thereof whereby said receptacle bag may be emptied by restoring said fastening means;

said fastening means is a hook and loop strip fastening means.

2. A device as recited in claim 1 wherein:

said support frame extends substantively transversely across the rear portion of said lawn tractor, said support frame functioning to extend or hold out an upper portion of said leaf receptacle bag.

3. A device as recited in claim 1, wherein:

said leaf receptacle adapter is positionally located proximate to one side of the support frame; said leaf receptacle adapter being off-set positionally from a centerline of said leaf receptacle bag, whereby said leaf conduit is noninterferring with a tractor seating or with tractor equipment controls.

4. A device as recited in claim 1, wherein:

said leaf receptacle bag has a pliable protective layer applied external to said leaf receptacle bag; said protective layer being disposed under said bag, whereby the wearing qualities of said leaf receptacle bag are improved.

* * * * *